United States Patent Office 3,386,019
Patented May 28, 1968

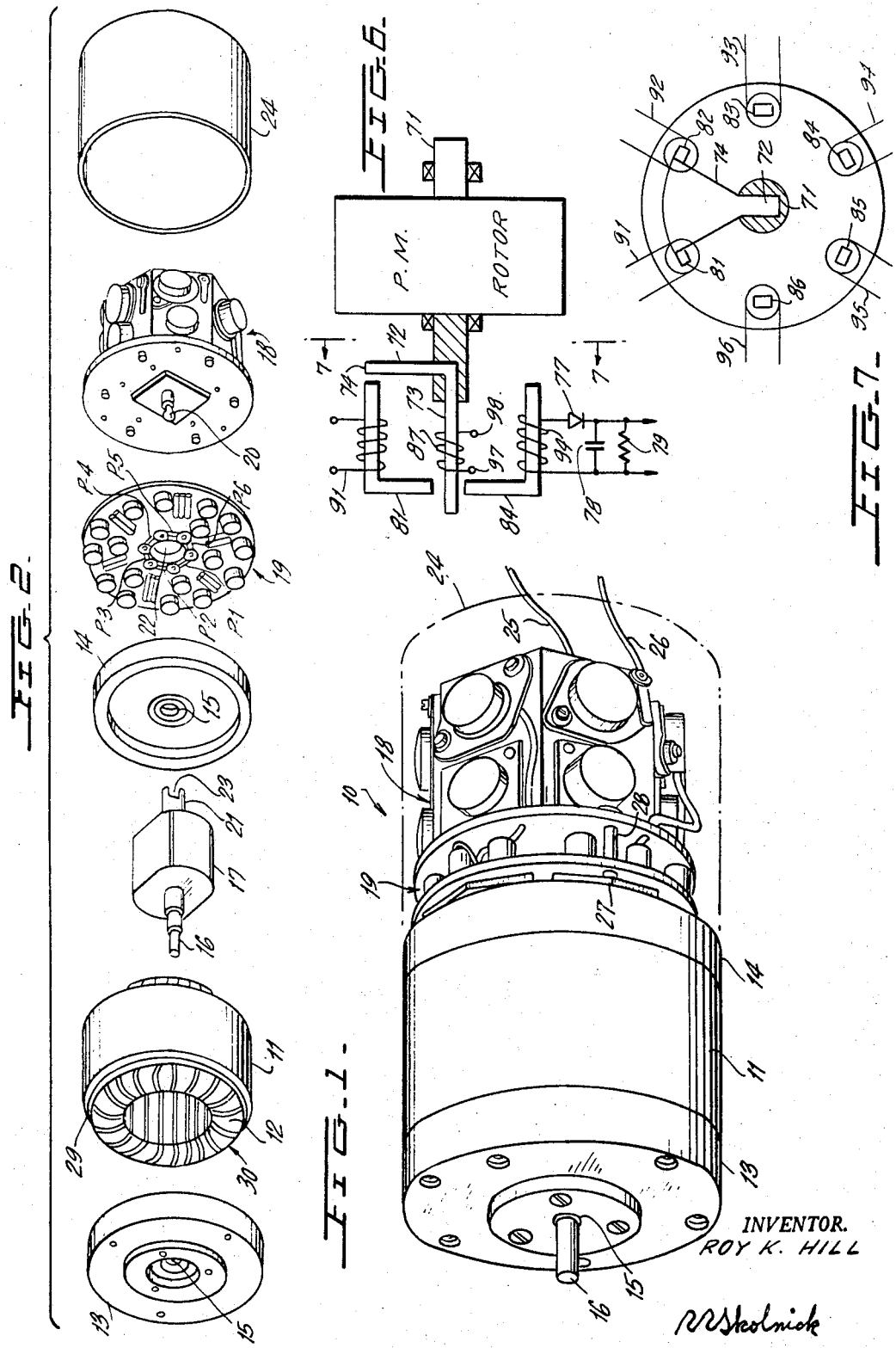

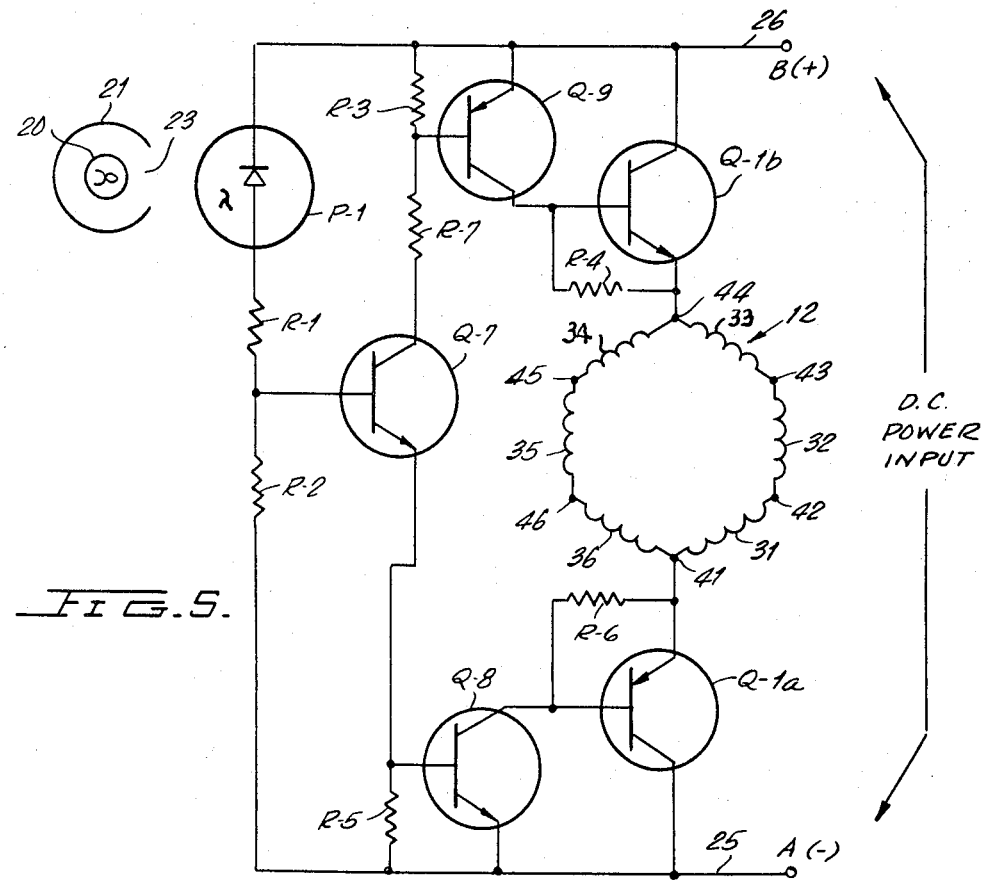
Fig. 5.
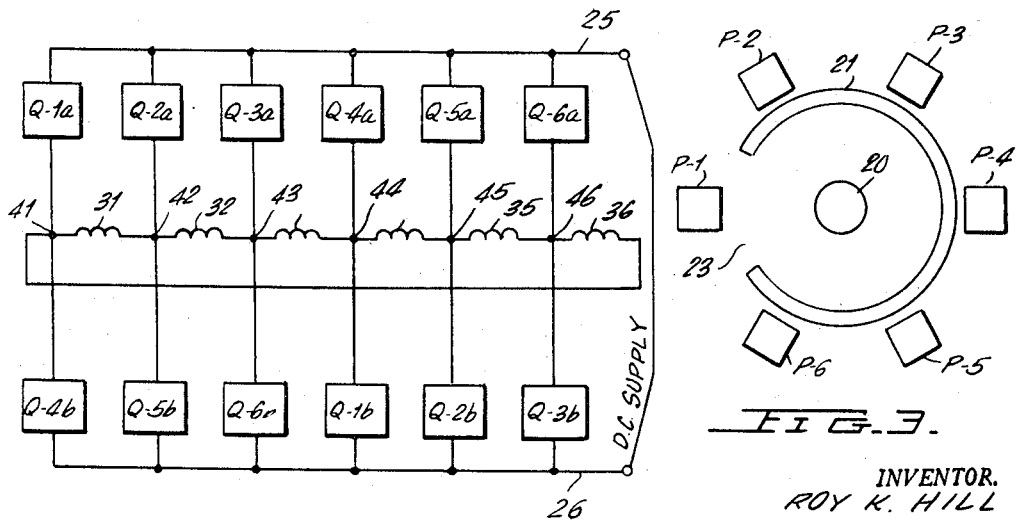
Fig. 4.
Fig. 3.
INVENTOR.
ROY K. HILL

3,386,019
BRUSHLESS DIRECT CURRENT MOTOR
Roy K. Hill, Bristol, Tenn., assignor to Sperry Rand Corporation, Sperry Farragut Company Division, Bristol, Tenn., a corporation of Delaware
Original application Oct. 8, 1962, Ser. No. 228,849. Divided and this application Apr. 19, 1966, Ser. No. 598,526
2 Claims. (Cl. 318—138)

ABSTRACT OF THE DISCLOSURE

A D.C. powered motor is provided with a brushless commutating means including a rotatable L-shaped magnetic member having one leg extending along the axis of rotation for the magnetic member. Such leg also extends through the center of a single coil having an A.C. signal impressed thereon so that for all angular positions of the magnetic member coupling between such member and the coil is uniform. The other leg of the magnetic member sweeps in front of a circular array of pole faces to induce switching signals in individual pickup coils associated with the individual pole faces. The aforesaid pole faces are disposed at the ends of stationary pole pieces each having an individual one of the pickup coils coupled thereto. Other ends of the stationary pole pieces are positioned in uniform magnetic coupling relation to the first recited leg of the rotatable magnetic member for all positions of the latter.

---

This application is a division of copending application Serial No. 228,849 filed October 8, 1962, relating to direct current, energized motors in general, and more particularly relating to a motor having the operating characteristics of a conventional D.C. motor; yet is constructed so that commutation takes place without utilizing wearing surfaces, sliding surfaces, separable contacts or contact devices having relatively movable parts which physically engage one another.

In a conventional direct current machine, commutation is essentially a mechanical switching operation by which currents through the various armature conductors are cyclically reversed in sequence as a function of rotor position. This continuous switching process is accomplished by means of brushes and a segmented commutator so that commutation is unavoidably accompanied by friction wear, and sparking with its attendant generation of R.F. noise. These disadvantages of commutation frequently prohibit the utilization of D.C. motors in critical applications even though the performance characteristics and input requirements favor the use of a D.C. motor in all other respects.

The prior art has produced a number of brushless D.C. machines, but it is believed that none of the prior art devices provide the performance characteristics of a conventional commutation D.C. machine. That is, these machines either convert direct current to alternating current to effectively provide an A.C. motor or else rotor velocity is employed for switching control. In either event, the result is not a duplication of direct current motor performance. The instant invention provides a D.C. motor having the desirable characteristics of a conventional commutating machine, but does not require relatively moving parts in physical engagement in order to achieve commutation. Further, rotor position is detectible even with the machine at standstill so that current switching control is independent of rotor velocity.

In one embodiment of the instant invention, conventional commutation is simulated by an optical sensing system in conjunction with an electronic switching network. This optical electronic system is capable of reversing and advancing armature currents in sequence as a function of rotor position. The motor utilizes a permanent magnet rotor for field excitation in combination with a stator comprising conventional D.C. armature windings.

A light source fixed to the motor frame has the beam thereof directed through an aperture in a shield carried by the rotor and rotatable therewith. The light beam passing through the shield aperture impinges upon a least one of a number of photoelectric devices spaced around the shield so that as the rotor rotates, the light beam scans the photoelectric devices in sequence. As the photoelectric devices are illuminated, the impedance level of a circuit controlled thereby is lowered so that it acts as a closed switch permitting current to pass through appropriate stator windings in the appropriate direction.

The number of photoelectric devices provided is equal to the number of commutator bars which would normally be required for a similar armature winding of a conventional D.C. machine. As the rotor rotates, a particular photoelectric device is illuminated causing particular armature windings to be energized. The energized windings are positioned so that the magnetic fields generated thereby cooperate with the field of the permanent magnet to cause rotation of the rotor in the required direction.

Accordingly, a primary object of the instant invention is to provide a novel construction for a brushless D.C. machine.

Another object is to provide a brushless D.C. machine having the characteristics of a conventional commutating D.C. machine in that current flows through all sections of the stator winding for substantially all rotor positions.

Still another object is to provide means whereby a sequence of electrical signals are determined by rotor position independent of rotor speed.

A still further object is to provide a D.C. machine in which commutation is achieved by electronic switching means without the necessity of uitlizing relatively moving parts which physically engage one another.

A still further object is to provide a D.C. motor in which commutation is achieved by means of a rotating magnetic member extending from a single coil which generates a signal that is distributed in sequence to pickup coils arranged in a circular array.

Yet another object is to provide a D.C. machine in which switching signals are coupled to the commutating device by means of a field acting through an air gap.

These as well as other objects of this invention shall become readily apparent after reading the following description of the accompaning drawings in which:

FIGURE 1 is a perspective of a brushless D.C. machine constructed in accordance with the teachings of the instant invention.

FIGURE 2 is an exploded perspective of the machine of FIGURE 1.

FIGURE 3 is a schematic representation of the rotor position detecting portion of the motor illustrated in FIGURES 1 and 2.

FIGURE 4 is a schematic illustrating the stator windings and their connections to the D.C. energizing source through the electronic switching devices typically illustrated in FIGURE 5.

FIGURE 5 is a schematic illustrating one of the six photoelectric switching units of FIGURE 4.

FIGURE 6 is a schematic of another embodiment of this invention in which switching signals are magnetically coupled to the commutating devices.

FIGURE 7 is a cross-section taken through line 7—7 of FIGURE 6 looking in the direction of arrows 7—7 with certain elements removed for the sake of clarity.

Now referring to FIGURES 1–5 and more particularly to FIGURE 2. Brushless D.C. motor 10 comprises shell 11 which surrounds stationary armature assembly 30. The ends of shell 11 are covered by front and back end caps 13, 14, respectively, each provided with suitable bearings 15 which rotatably support motor shaft 16. Rotor 17 is a permanent magnet keyed to shaft 16 and disposed within armature assembly 30.

Stationary armature assembly 30 includes relatively low reluctance magnetic member 29 which is laminated and provided with teeth and slots wherein winding 12 is disposed and held by shell 11. Winding 12 consists of a conductor threading the slots of magnetic member 29 a plurality of times and finally joining the starting point in a closed loop (see FIGURE 5). A plurality of equally spaced taps or junction points 41 through 46 divide winding 12 into six sections or coil portions 31 through 36.

Commutation is achieved by means of solid state power switching unit 18 and solid state control and preamplifier unit 19 controlled by light source 20 and shield 21. Units 18 and 19 are mounted to the rear of end cap 14 being operatively positioned by means of appropriate spacers 27, 28. Preamplifier unit 19 includes a plurality of photoelectric devices P–1 through P–6 equally spaced from one another and circularly arranged about shield 21.

Light source 20 is mounted to power switching unit 18 on the forward side thereof and extends through central aperture 22 of preamplifier unit 19 into the interior of shield 21. Shield 21 is keyed to motor shaft 16 and is disposed rearwardly of end cap 14 extending through aperture 22. Shield 21 is provided with an aperture 23 so positioned and shaped that light emanating from source 20 and passing through aperture 23 will impinge upon at least one of the photoelectric devices P–1 through P–6 for any position of rotor 17.

Cover 24 is provided as an enclosure for the elements to the rear of end cap 14. An appropriate aperture not shown is provided through cover 24 to permit the passage of leads 25, 26 for connecting motor 10 to a source of direct current.

FIGURE 5 illustrates the current conditions through armature 12 when photoelectric device P–1 is illuminated, as will be more fully explained hereinafter. At this time, winding junctures 41 and 44 are essentially connected directly to leads 25, 26 which in turn are connected to the negative and positive terminals of a D.C. power source. Under these circumstances, two parallel current paths exist between junctures 41 and 44. One path consists of windings 34, 35, 36 connected in series and the other path consists of windings 33, 32, 31 connected in series.

Photoelectric device P–1 is of a type well-known to the art which possesses two states of conduction. That is, low conductance or high impedance when not illuminated and high conductance or low impedance when illuminated. Since the position of rotor 17 determines the position of shield slit 23, the position of rotor 17 determines whether or not P–1 is illuminated.

When P–1 is illuminated there is a relatively low impedance current path from lead 25 through the emitter to base junction of NPN type transistor Q–8, through the emitter to base junction of NPN type transistor Q–7 through resistor R–1 and P–1 to lead 26. This emitter to base current of Q–7 is sufficient to create a low impedance path from emitter to collector of Q–7. Consequently, a second larger current flow in the now relatively low impedance path from lead 25 through the emitter to base junction of Q–8, from the emitter to collector of Q–7 through R–7, through the base to emitter junction of PNP type transistor Q–9 to lead 26.

When this second current flows a low impedance condition is created from the emitter to collector of Q–8 and from the collector to emitter of Q–9. A third and still larger current flows through the now relatively low impedance path from lead 25 to the emitter Q–8, from the emitter to collector of Q–8, from the base to emitter junction of PNP type transistor Q–1a, through the windings of armature 11 from juncture 41 to juncture 44 through the emitter to base of NPN type transistor Q–1b, thence from the collector to emitter of Q–9 to lead 26.

A fourth and still larger current flows in the now relatively low impedance path from lead 25, from collector to emitter of Q–1a, through armature 11 between juncture 41 and 44, thence from emitter to collector of Q–1b to lead 26.

These four current paths drop in impedance in a rapid almost instantaneous sequence with a switching time in the order of microseconds which is an insignificant portion of the conducting time for photoelectric device P–1.

R–1 and R–2 are connected between photoelectric device P–1 and lead 25 with the juncture between these resistors being connected to the base of Q–7. Resistor R–5 is connected between the emitter of Q–7 and lead 25 while resistor R–3 is connected between the base of Q–9 and lead 26. Resistor, R–7 is connected between collector of Q–7 and base of Q–9. Resistor R–4 is connected between the emitter and base of Q–1b while resistor R–6 is connected between the emitter and base of Q–1a. The purpose of R–2 through R–6 is a well known and practiced art. They offer better stabilization of the associated transistors by shunting some of the transistor's leakage current around the base-emitter junction.

The current between junctures 41 and 44 produces a magnetic flux oriented to be essentially in spaced quadrature with the flux of rotor 17. When rotor 17 is rotated for 360° divided by the number of switching legs used, in this case six, shield 21 is advanced so that light directed through aperture 23 illuminates photoelectric device P–2 of a circuit identical to that of FIGURE 5. However, as seen in FIGURE 4, this circuit connects the armature windings so that current now flows in two parallel paths between junctures 42 and 45. Aperture 23 is wide enough to always illuminate at least one of the photoelectric devices P–2 through P–6 with a small overlap. This is typical of commutation in conventional D.C. machines and assures that armature 11 will be energized on starting for all positions of shaft 16.

As should now be apparent, there are six different circuits identical to that of FIGURE 5. Essentially, only one of these circuits is active at any given time. It is the active circuit which determines the current path through the windings of armature 11. This arrangement is schematically illustrated in FIGURE 4. As seen from the description of FIGURE 5, Q–1a and Q–1b conduct simultaneously. Similarly there is a simultaneous conduction of transistors Q–2a and Q–2b, simultaneous conduction of Q–3a and Q–3b, and so on.

To insure deep saturation of transistors Q–1a and Q–1b, an alternate connection can be made. The emitter of Q–9 can be connected to the base of PNP transistor, Q–1a and the emitter of Q–8 can be connected to the base of NPN transistor, Q–1b, the collector of Q–9 being connected directly to juncture 45 and the collector of Q–8 being connected directly to juncture 42. The collector of Q–1b can be connected to juncture 41 and the emitter of Q–1b can be connected to line 25 with the collector of Q–1a being connected to juncture 44 and the emitter of Q–1a being connected to line 26. Resistors R–4 and R–6 can be connected between emitter and base of transistors Q–1a and Q–1b, respectively.

FIGURES 6 and 7 illustrate another embodiment of this invention in which motor shaft 71 carries L-shaped member 72 constructed of magnetic material. Leg 73 of member 72 extends from one end of shaft 71 along the axis thereof while the other leg 74 is of fan shape and is positioned to sweep past a number of circularly arranged L-shaped pole pieces 81 through 86. Individual secondary windings 91 through 96 are provided for pole pieces 81 through 86, respectively. A single primary winding 87 surrounds leg 73 of member 72. One of the pole faces of each of the pole pieces 81 through 86 is positioned in magnetic coupling relationship to leg 73. The other pole faces of members 81 through 86 are circularly arranged and are positioned so that as shaft 71 rotates, leg 74 of member 72 will at all times be in magnetic coupling relationship with at least one of these latter mentioned pole pieces.

With the elements in the position of FIGURES 6 and 7, it is seen that leg 74 partly overlies the pole faces of pole pieces 81 and 82. Under these circumstances, two relatively low reluctance paths exist. One comprising member 72 and pole piece 81 and the other comprising member 72 and pole piece 82. A signal from an electronic oscillator (not shown) is introduced at terminals 97, 98 of primary 87 with this oscillator signal being coupled to secondary windings 91 and 92. At this time, there is no output from secondary windings 93 through 96. The signals introduced in the secondary windings may be used directly to effect switching operations or may be converted to a D.C. signal by elements 77 through 79 in the illustration of FIGURE 6.

Thus, it is seen that the instant invention provides a novel construction for a direct current machine having the characteristics of a typical D.C. machine with brush type commutating means. The construction is such that all relatively moving commutating elements are physically spaced from each other so that switching signals are coupled through an air gap. Further, the construction is such that rotor position is detectible even with the rotor at standstill.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device of the class described comprising a torque producing unit, a switching means and control means for operating said switching means; said unit including a rotor and a stator; said switching means operatively connected to said stator for controlling energization thereof; said control means including a portion mounted for rotation by said rotor; said portion being physically spaced from said switching means and operatively positioned to control operation thereof whereby predetermined parts of said stator are energized in accordance with rotor position; said switching means compising a plurality of secondary coils and a plurality of stationary pole pieces, one for each of said secondary coils; said pole pieces arranged so that a first pole face of each constitute a circular array; said portion comprising a rotatable pole piece; said control means including a primary coil positioned in uniform magnetic couplng relation with said rotatable pole piece for all angular positions thereof; for any position of said rotor, said rotatable pole piece cooperating with at least one said stationary pole piece to form a relatively low reluctance path whereby A.C. signals impressed upon said primary coil will be coupled through said rotatable pole piece to the particular secondary coil associated with the low reluctance path; said rotatable pole piece being generally L-shaped with one leg thereof positioned along the rotational axis of said rotor in magnetic coupling relationship with said prmary coil; the other leg of said rotatable pole piece being in magnetic coupling relationship with a different one of said first pole faces for different positions of said rotor; said one leg extending into said primary coil; and the other leg of said rotatable pole piece being generally fan-shaped with the side boundaries diverging as they move away from said rotational axis.

2. A device of the class described comprising a torque producing unit, a switching means and control means for operating said switching means; said unit including a rotor and a stator; said switching means operatively connected to said stator for controlling energization thereof; said control means including a portion mounted for rotation by said rotor; said portion being physically spaced from said switching means and operatively positioned to control operation thereof whereby predetermined parts of said stator are energized in accordance with rotor position; said switching means comprising a plurality of secondary coils and a plurality of stationary pole pieces, one for each of said secondary coils; said pole pieces arranged so that a first pole face of each constitute a circular array; said portion comprising a rotatable pole piece; said control means including a primary coil positioned in uniform magnetic coupling relation with said rotatable pole pece for all angular positions thereof; for any position of said rotor, said rotatable pole piece cooperating with at least one said stationary pole piece to form a relatively low reluctance path whereby A.C. signals impressed upon said primary coil will be coupled through said rotatable pole piece to the particular secondary coil associated with the low reluctance path; said rotatable pole piece being generally L-shaped, one leg of said rotatable pole piece positioned along the rotational axis of said rotor and extending into said primary coil for all angular positions of said rotor; said one leg positioned in uniform magnetic coupling relationship to a second pole face of each of said stationary pole pieces; the other leg of said rotatable pole piece being in magnetic coupling relationship with a different one of said first pole faces for different positions of said rotor; said one leg of the rotatable pole piece being positioned along the rotational axis for said rotatable pole piece and the other leg extends in a plane generally perpendicular to said rotational axis for said rotatable pole piece; said other leg being fan-shaped with side boundaries diverging as they move away from the rotational axis for said rotatable pole piece; said other leg being proportioned so that for any given angular position of said rotatable pole piece the other leg is in magnetic coupling relationship with at least one and no more than two of said pole faces.

References Cited

UNITED STATES PATENTS

| | | | |
|---|---|---|---|
| 2,980,839 | 4/1961 | Haeussermann | 318—254 X |
| 3,091,728 | 5/1963 | Hogan et al. | 318—138 |

ORIS L. RADER, *Primary Examiner.*

G. SIMMONS, *Assistant Examiner.*